Figure 1:
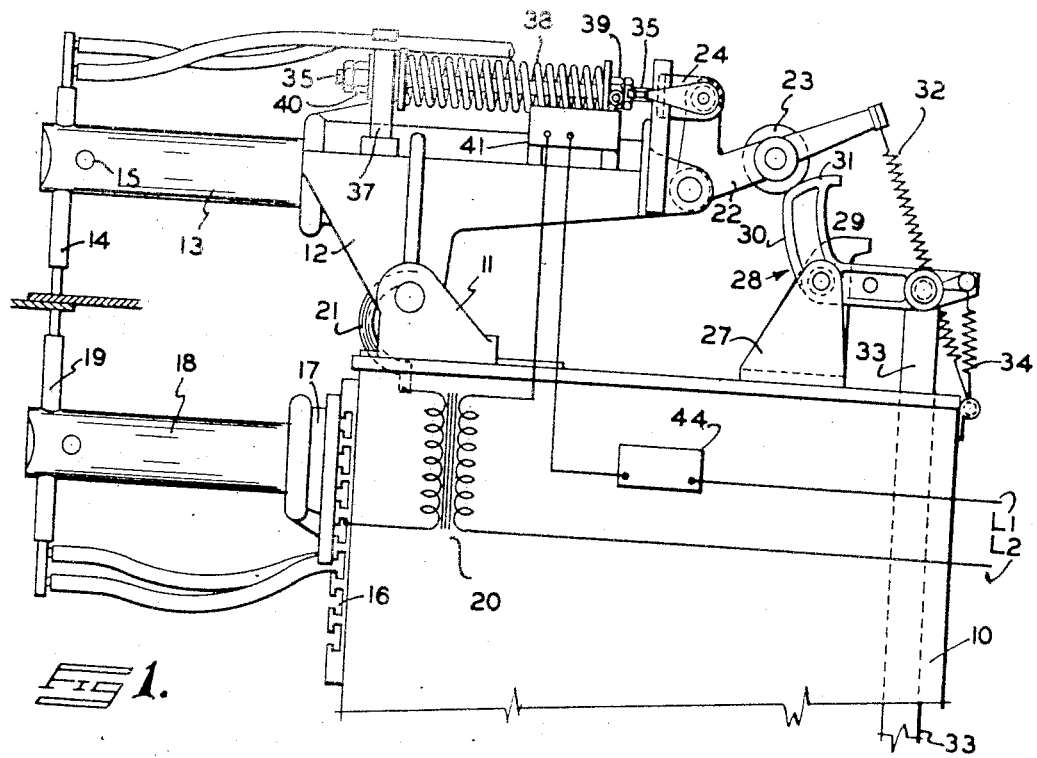

Dec. 21, 1943.    M. M. A. SEELOFF    2,337,302
SPOT WELDER
Filed April 29, 1942

MELVIN M. A. SEELOFF, Inventor

By Francis J. Klempay
Attorney

Patented Dec. 21, 1943

2,337,302

UNITED STATES PATENT OFFICE 2,337,302

SPOT WELDER

Melvin M. A. Seeloff, Warren, Ohio, assignor to The Taylor-Winfield Corporation, Warren, Ohio, a corporation of Ohio Application April 29, 1942, Serial No. 440,942

8 Claims. (Cl. 219—4)

This invention relates to electric resistance welding apparatus of the press or spot welding type and more particularly to improved methods and arrangements for moving and applying welding pressure through the movable electrode of such apparatus.

The function of the electrode operating mechanism of a press or spot welder is to first bring the electrodes into engagement with the work positioned therebetween and to thereafter apply the required welding pressure to the electrodes. Normally one electrode is fixed in adjusted position on the machine while the other electrode is mounted for operative movement by said mechanism. But a small amount of force is required to effect the closing movement while the welding pressure or force required is usually quite large. If the operating mechanism is such that its driving element moves in proportion to the movement of the movable electrode and tends to move at uniform speed, either the electrode closing movement will be quite undesirably slow or at the completion of such movement the parts will be subjected to considerable shock and it will be difficult to controllably exert the required welding pressure. It is, accordingly, the primary object of the present invention to provide an operating mechanism for a movable electrode of a welding machine which operates in such manner that the electrodes are quickly brought into engagement with the work and upon completion of this closing movement, the welding pressure is smoothly and uniformly applied without any substantial increase in stress in the primary moving or operating mechanism. Thus the inertia of the moving parts of the primary moving or operating mechanism, including the foot of the operator in a manually operated welder, is not absorbed by impact but rather is gradually applied to the effecting of the required welding pressure.

Another object of the invention is the provision of an improved mechanism for operating the movable electrode in a manually operated press or spot welder whereby quick operation of the machine may be effected while the manually engageable operating treadle or other element may be moved through its entire path of travel without encountering any substantial change in its resistance to movement. This materially increases the ease of operation of the machine as well as reducing the wear and tear on the parts and enabling an accurate control of the welding pressure to be effected. These objects are attained, in either a power or manually operated machine, by employing a coupling between an operating element of the primary moving means and the electrode carrying member which is operative at the start of the cycle of movement of the element to translate its movement into quick movement of the member and to thereafter translate the further movement of the element into the required welding force or pressure. Thus but a portion of the total travel of the element, which may be considered as the foot treadle in a manual machine, is employed to effect the closing of the electrodes onto the work while a substantial part of the travel is employed to effect the welding pressure.

The above and other objects and advantages of the invention will become apparent upon consideration of the following detailed specification and the accompanying drawing wherein there is specifically disclosed a preferred embodiment of the invention.

Figure 2:
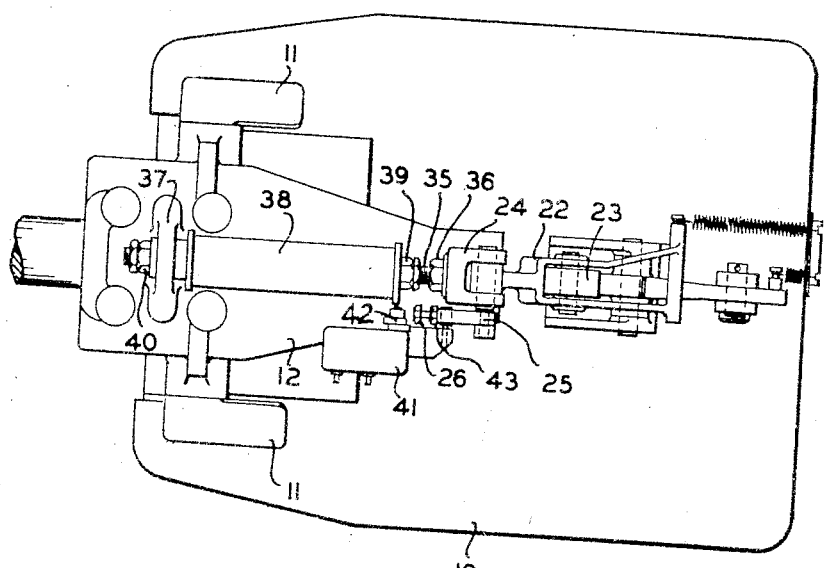

In the drawing:

Figure 1 is a side elevation of the upper portion of a manually operated spot welder constructed in accordance with the principles of the invention, certain of the electrical apparatus of the welder being shown schematically; and Figure 2 is a plan on an enlarged scale of a portion of the apparatus of Figure 1.

In the drawing, reference numeral 10 indicates a housing or pedestal on the top of which is secured spaced ears 11 on and between which is pivotally supported a rocker arm 12. Extending outwardly of the rocker arm 12 and carried thereby is an electrode holder 13 which, in accordance with usual practice, is bifurcated at its outer end to adjustably receive an electrode 14, the bolt 15 serving to secure the electrode in adjusted position.

On the front face of housing 10 is a mounting block 16 on which is adjustably mounted a bracket 17 carrying an electrode holder 18 similar to the electrode holder 13. Holder 18 supports the normally fixed electrode 19. As is well understood in the art, the housing 10 encloses the welding transformer shown schematically at 20 and one secondary terminal of this transformer is connected directly to the block 16, while the other secondary terminal comprises a flexible bar 21 extending upwardly between the ears 11 and between the spaced depending legs of the rocker arm 12 to make electrical connection with the arm and/or holder 13. Block 16 is insulated from the frame or housing of the machine and consequently from the bracket 12 and holder 13.

On the end of arm 12 opposite holder 13 there is pivoted a bellcrank lever 22, one leg of which is bifurcated to rotatably mount a cam following roller 23, while the other leg thereof is pivotally connected to a yoke 24. The pin making the last mentioned connection extends outwardly of one side of the yoke to mount a member 25 into which is screwed a bolt 26.

Pivotally mounted on a bracket 27 secured to the top of housing 10 is a bellcrank lever 28, one leg 29 of which is provided with a peripheral cam surface having a steep portion 30 and a flatter end portion 31. As shown in Figure 1, the cam 30, 31 is engaged by the follower 23, a spring 32 insuring the constant contact between the cam and follower. The spring 32 has the further function of normally maintaining the electrodes 14 and 19 in spaced open relation regardless of the length of the holders 13 and 18. Connected with the other leg of the lever 28 is a rod 33 which is moved upwardly by the pivotally mounted foot lever, not shown. In accordance with usual practice, the foot lever is provided with an accessible foot engaging treadle and as the operator steps on the treadle and moves it downwardly, the rod 33 is moved upwardly and the lever 28 is rotated in a counterclockwise direction as viewed in Figure 1. A spring 34 rotates the lever 28 in the opposite direction and moves the rod 33 downwardly when the foot treadle is released.

A rod 35 is screwed into the yoke 24 and locked with respect thereto by the nut 36. Rod 35 is slideably received in a bore extending through an ear 37 formed integral with or rigidly attached to the arm 12. A coil spring 38 is positioned between ear 37 and nuts 39 adjustably positioned along the rod 35. Thus the rod 35 is free to move to the left, as viewed in Figure 1, with respect to the arm 12 against the compression of spring 38 while movement to the right from the position shown in Figure 1 is prevented by the nuts 40.

A sensitive switch 41 having an operating arm 42 is supported on the arm 12 in such position that the operator 42 is engageable by the head of bolt 26 and it should be apparent that when the parts are properly adjusted, the switch may be closed upon a predetermined relative movement of the lever 22 relative to the arm 12 which relative movement is accomplished by compressing the spring 38. Bolt 26 is adjustable in and out and a lock nut 43 maintains the bolt in adjusted position.

Switch 41 controls the flow of welding current to the electrodes by controlling the flow of current from a source L1, L2 to the primary of the welding transformer as indicated in Figure 1. A timer 44 may be incorporated to limit the duration of the current flow upon closing of switch 41 which switch, in actual practice, operates through a relay as is well understood in the art.

In operation, one or both of the electrodes 14 and 19 are so adjusted in their holders that both the electrodes come into contact with the pieces to be welded at the time the lever 28 has been rotated a sufficient angular distance to position the point of contact between the cam and follower 23 at approximately the zone of juncture between the cam portions 30 and 31. This adjustment takes into consideration the average thickness of the pieces to be welded so that normally the steep portion 30 of the cam will be used to effect a quick rocking movement of the arm 12 to bring the electrodes into engagement with the work. Figure 1 shows the parts in this position. Continued downward movement of the foot treadle moves the flatter portion 31 of the cam under the follower 23 so that the welding pressure is applied without any substantial increase in resistance being encountered in the downward movement of the foot treadle. It should be observed that welding current cannot flow through the electrodes until the lever begins to rotate with respect to the arm 12 and the spring 38 begins to compress. Consequently the welding current cannot be applied until a predetermined pressure, as governed by the initial expansive force exerted by the spring 38, is exerted on the work by the electrodes. This pressure may be varied by adjusting the nuts 39 as will be understood.

It should now be apparent that I have provided an electrode moving mechanism for spot welders which accomplishes the objects initially set out. But a small portion of the total travel of the foot treadle is required to bring the electrodes into engagement with the work while the longer remaining travel is resolved into greater force multiplication to effect the welding pressure and the required compression of the welding pressure applying spring. In this manner the welder is made much easier to operate, uniform results are attained, and by reason of the elimination of undue stress and shock in any of the operative parts, less maintenance is required.

It should be understood that the above specifically described embodiment of the invention is illustrative only since obviously many changes may be made therein without departing from the spirit or scope of the invention. Reference should therefore be had to the appended claims in determining the scope of the invention.

I claim:

1. A manually operated spot welder comprising a normally fixed electrode, a movable electrode, a rocker arm supporting said movable electrode for movement toward and away from said fixed electrode, means to rock said arm comprising a manually operated cam and a cam follower connected with said arm; said cam having a steep portion to effect a quick closing movement of the electrodes onto the work positioned therebetween, and a flatter portion to effect welding pressure between said electrodes upon completion of said closing movement.

2. A manually operated spot welder comprising a normally fixed electrode, a movable electrode, a member adjustably mounting said movable electrode for movement toward and away from said fixed electrode, means to move said member comprising a manually operated cam and a cam follower connected with said member; said cam having a steep portion to effect a quick closing movement of the electrodes onto the work positioned therebetween, and a flatter portion to effect welding pressure between said electrodes upon completion of said closing movement.

3. Welding apparatus comprising in combination a normally fixed electrode, a movable electrode, a member adjustably mounting said movable electrode for movement toward and away from said fixed electrode, a second movable member, a yieldable connection between said members whereby upon the closure of said electrodes onto the work said second member will move relative to said first mentioned member upon the application of a predetermined force to said second mentioned member, means to move said second member comprising an element adapted to move a predetermined distance during each welding operation of said apparatus, and a linkage between said element and said second member whereby upon initiation of movement of said element and during movement thereof through but a portion of its path of travel a quick closing movement of the electrodes onto the work positioned therebetween is effected while a substantial portion of movement of said element it utilized to effect a yielding of said yielding member.

4. Welding apparatus comprising in combination a normally fixed electrode, a movable electrode, a rocker arm adjustably mounting said movable electrode for movement toward and away from said fixed electrode, a bell-crank lever pivoted on said arm, a yieldable connection between one leg of said lever and said arm, a cam follower on the other leg of said member, a cam adapted to be engaged by said follower, means to move said cam; said cam having a steep portion to effect a quick closing movement of said electrodes onto the work positioned therebetween, and a flatter portion to effect welding pressure between said electrodes as determined by the resistance offered by said yieldable means.

5. Welding apparatus comprising in combination a normally fixed electrode, a movable electrode, a member adjustably mounting said movable electrode for movement toward and away from said fixed electrode, means to move said member comprising a cam and a yieldable connection between said member and cam, means to move said cam; said cam having a steep portion to effect a quick closing movement of said electrodes onto the work positioned therebetween, and a flatter portion to effect welding pressure between said electrodes as determined by the resistance offered by said yieldable connection.

6. Welding apparatus comprising in combination a normally fixed electrode, a movable electrode, a rocker arm adjustably mounting said movable electrode for movement toward and away from said fixed electrode, a bellcrank lever pivoted on said arm, a yieldable connection between one leg of said lever and said arm, a cam follower on the other leg of said lever, a second bellcrank lever one leg of which is connected with a moving means while the peripheral surface of the other leg is shaped in the form of a cam having a steep portion adjacent the axis of pivotal support therefor and a portion of less pitch adjacent the outer end of the said other leg, and means to maintain said follower in contact with said cam.

7. Welding apparatus comprising in combination a normally fixed electrode, a movable electrode, a member adjustably mounting said movable electrode for movement toward and away from said fixed electrode, means to move said member comprising a bellcrank lever one leg of which is shaped in the form of a cam and a yieldable connection between said cam and member, a moving means connected with the other leg of said lever, said cam having a steep portion adjacent the axis of pivotal support of the lever and a portion of lesser pitch further removed from said axis.

8. Apparatus according to claim 7 further characterized in that said moving means comprises a manually operated element having a predetermined path of travel, the arrangement being such that but a portion of the travel of said element is required to quickly bring the electrodes into engagement with the work positioned therebetween while the remainder of the path of travel of said element is employed to apply welding pressure by deforming said yieldable connection.

MELVIN M. A. SEELOFF.